United States Patent
Ogasawara et al.

(10) Patent No.: US 9,027,425 B2
(45) Date of Patent: May 12, 2015

(54) TRANSMISSION DEVICE FOR INTERNAL COMBUSTION ENGINE

(71) Applicant: Honda Motor Co., Ltd., Tokyo (JP)

(72) Inventors: Atsushi Ogasawara, Wako (JP); Noriaki Takano, Wako (JP); Eiichi Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 126 days.

(21) Appl. No.: 13/767,964

(22) Filed: Feb. 15, 2013

(65) Prior Publication Data

US 2013/0247703 A1    Sep. 26, 2013

(30) Foreign Application Priority Data

Mar. 22, 2012    (JP) .................... 2012-065179

(51) Int. Cl.
| | |
|---|---|
| *F16H 61/32* | (2006.01) |
| *F16H 63/18* | (2006.01) |
| *F16H 59/10* | (2006.01) |
| *F16H 59/04* | (2006.01) |
| *F16H 63/14* | (2006.01) |

(52) U.S. Cl.
CPC ............... *F16H 59/04* (2013.01); *F16H 63/14* (2013.01); *F16H 63/18* (2013.01)

(58) Field of Classification Search
CPC ......... F16H 61/32; F16H 61/30; F16H 61/12; F16H 61/2807; F16H 59/70; F16H 63/18; F16H 63/304; F16H 3/006; F16H 63/20; F16H 63/30; F16H 59/042; F16H 61/0293; F16H 59/10; F16H 59/06; F16H 63/36; F16H 61/24; F16H 63/3408; F16H 63/38; B62M 25/06; B60W 30/18; B60K 2741/22; G05G 13/00

USPC ........... 74/335, 337.5, 473.1, 473.16, 473.25, 74/473.19, 493.26
See application file for complete search history.

(56) References Cited

U.S. PATENT DOCUMENTS

| | | | | |
|---|---|---|---|---|
| 6,085,607 | A * | 7/2000 | Narita et al. ..................... | 74/335 |
| 6,516,686 | B1 * | 2/2003 | Hori et al. ..................... | 74/730.1 |
| 7,631,570 | B2 * | 12/2009 | Mizuno et al. .................. | 74/331 |
| 7,866,227 | B2 * | 1/2011 | Mizuno et al. .................. | 74/331 |
| 8,276,472 | B2 * | 10/2012 | Sotani et al. ................. | 74/337.5 |
| 8,307,730 | B2 * | 11/2012 | Koyama et al. ................. | 74/335 |
| 8,387,477 | B2 * | 3/2013 | Ieda et al. ....................... | 74/335 |
| 2007/0074593 | A1 * | 4/2007 | Mizuno et al. .................. | 74/330 |

FOREIGN PATENT DOCUMENTS

JP    2011-214609 A    10/2011

* cited by examiner

*Primary Examiner* — William Kelleher
*Assistant Examiner* — Jude Agendia
(74) *Attorney, Agent, or Firm* — Birch, Stewart, Kolasch & Birch, LLP

(57) ABSTRACT

A transmission device for an internal combustion engine for preventing components thereof from being damaged for making the components smaller in size and weight, reducing a load and a time required to shift gear positions for increased operability and for reducing overall size and weight. A transmission device for an internal combustion engine includes a shift drum angularly movable by a star-shaped drum plate that is turned when a change spindle is turned and a stopper roller for limiting the star-shaped drum plate against turning movement. The star-shaped drum plate includes peaks corresponding to a plurality of gear positions and valleys interposed between the peaks. A selected one of the valleys includes a curved wall for being more gently contacted by the stopper roller than curved surfaces of the other valleys which are contacted by the stopper roller.

20 Claims, 16 Drawing Sheets

TRANSMISSION DEVICE FOR INTERNAL COMBUSTION ENGINE

CROSS-REFERENCE TO RELATED APPLICATIONS

The present application claims priority under 35 USC 119 to Japanese Patent Application No. 2012-065179 filed Mar. 22, 2012 the entire contents of which are hereby incorporated by reference.

BACKGROUND OF THE INVENTION

1. Field of the Invention

The present invention relates to a shift mechanism for a transmission device for an internal combustion engine for use on motorcycles or the like.

2. Description of Background Art

Transmission devices for use on motorcycles or the like operate as follows: When the rider operates the change pedal of a transmission device, a change spindle is turned. In response to the turning of the change spindle, an intermittent feed mechanism rotates a shift drum intermittently, moving a shift fork engaging the shift drum to a given position. The shift fork thus moved changes intermeshing gears of a gear group of the transmission mechanism, switching from one gear position to another gear position.

The intermittent feed mechanism includes a shift drum plate integrally fixed to a side surface of the shift drum. The shift drum plate is substantially star-shaped with peaks and valleys on its outer circumferential surface. A change spindle arm is provided for meshing with feed pins on the shift drum plate to turn the shift drum plate in response to the turning of the change spindle. A shift drum stopper is disposed adjacent to the shift drum plate and is normally biased to press the circumferential surface of the shift drum plate. The shift drum stopper has a stopper roller for being pressed against the circumferential surface of the shift drum plate with a stopper lever supporting the stopper roller thereon. A support shaft is provided on which the stopper lever is rotatably supported with a biasing means for biasing the stopper roller to be pressed against the circumferential surface of the shift drum.

When the rider of the motorcycle operates the change pedal for shifting gears, the change spindle is turned to move the change spindle arm, turning the shift drum plate. When the stopper roller of the shift drum stopper moves over one of the peaks of the shift drum plate into an adjacent valley, the stopper roller is pressed into the valley by the biasing means, thus stopping the shift drum plate against rotation. In this manner, the shift drum plate is intermittently fed through a predetermined angle.

If the shift drum plate is fed quickly, then the instant the stopper roller of the shift drum stopper falls into the valley of the shift drum plate, the shift drum plate abruptly stops, posing an excessive load on the stopper roller, the stopper lever that supports the stopper roller, and the support shaft. Therefore, the shift drum stopper and the support shaft need to be reinforced, tend to be large in size, require a large load to be applied to shift gears, take a long time to shift gears, make the transmission device poor in operability, and make the transmission device large in overall size and weight. See, for example, Japanese Patent Laid-Open No. 2011-214609.

SUMMARY AND OBJECTS OF THE INVENTION

The present invention has been made in view of the above problems. It is an object of an embodiment of the present invention to provide a transmission device for an internal combustion engine, which prevents components thereof from being damaged for making them smaller in size and weight, reduces a load and a time required to shift gear positions for increased operability, and is reduced in overall size and weight.

According to an embodiment of the present invention, there is provided a transmission device for an internal combustion engine, that has a shift drum angularly movable by a star-shaped drum plate that is turned when a change spindle is turned, and a stopper roller for limiting the star-shaped drum plate against turning movement, wherein the star-shaped drum plate includes peaks corresponding to a plurality of gear positions and valleys interposed between the peaks, and a selected one of the valleys includes a curved wall for being more gently contacted by the stopper roller than curved surfaces of the other valleys that are contacted by the stopper roller.

According to an embodiment of the present invention, one of the peaks that is disposed next to the curved wall is lower than the other peaks.

According to an embodiment of the present invention, the one of the valleys has a deepest area, and a curved surface extending from one of the peaks that is next to the curved wall has a radius of curvature that is equal to the radius of curvature of the outer profile of the stopper roller, the curved wall includes a roller limiting wall and a dampening wall, the roller limiting wall is disposed on a side of the deepest area toward which the stopper roller rolls. The dampening wall is disposed between the roller limiting wall and the deepest area and has either a curved surface having a radius of curvature that is greater than the radius of curvature of the outer profile of the stopper roller or having a flat surface.

According to an embodiment of the present invention, the star-shaped drum plate is spaced from the change spindle with a gear transmission mechanism of the transmission device interposed therebetween. The transmission device further includes a pair of change spindle arms wherein one of the change spindle arms turns the star-shaped drum plate.

According to an embodiment of the present invention, the curved wall of the star-shaped shift drum plate is disposed in the selected one of the valleys which corresponds to a lowest one of gear positions selected when a change pedal disposed in front of a foot step is depressed.

According to an embodiment of the present invention, when the stopper roller abuts against the roller limiting wall, stopping the shift drum plate against rotation, a substantially right angle is formed between a straight line interconnecting a central point about which a stopper lever supporting the stopper roller is swingable and a central point about which the stopper roller is rotatable with a straight line tangential to the roller limiting wall at a point of intersection between the straight line and the roller limiting wall.

According to an embodiment of the present invention, the shift drum has a lead groove defined in a surface thereof for guiding a shift fork for changing gear positions of a gear transmission mechanism of the transmission device when the shift drum is turned. The lead groove include groove end portions with one of the groove end portions, which corresponds to the gear position at the dampening wall of the curved wall in the valley of the shift drum plate, being longer than the other of the groove portions which corresponds to the gear position which is free of the dampening wall of the curved wall.

According to an embodiment of the present invention, when the transmission device is operated to change gear positions, since the valley corresponding to the neutral position is combined with the curved wall for contacting the stopper roller more gently than the curved surface of the deepest area, a shock that is applied from the star-shaped shift drum plate to a stopper roller support member is reduced. Consequently, the stopper roller support member that supports the stopper roller is made durable, and the stopper roller support member may be reduced in size and weight. The rider can quickly operate the star-shaped shift drum plate for thereby increasing the operability of the transmission device and moreover reducing the cost of the transmission device.

According to an embodiment of the present invention, as the one of the peaks that is disposed next to the curved wall is lower than the other peaks, the stopper roller that moves from the peak to the curved wall swings a reduced distance, which, in combination with the reduced weight of the stopper roller support member, is capable of reducing reaction forces that the curved wall receives from the stopper roller. The curved wall can thus be reduced in size. Thus, the transmission device can also be reduced in size:

According to an embodiment of the present invention, the roller limiting wall can limit changing mechanism members including the shift drum against excessive rotation through the shift drum plate, and the dampening wall up to the roller limiting wall can absorb a load under forces of inertia generated by the operation of the change mechanism. The change mechanism can thus operate well under a reduced load.

According to an embodiment of the present invention, inasmuch as the shift drum plate and the change spindle are positioned with the gear transmission mechanism interposed therebetween, the change spindle arms, which are long arms, can easily achieve a lever ratio for the transmission device. This, in combination with the increased freedom of the layout of the transmission device, makes it possible to reduce the size of the internal combustion engine.

According to an embodiment of the present invention, even when the rider depresses the change pedal successively to shift down the transmission device quickly into lower gear positions, since the valley which corresponds to the lowest gear position is combined with the curved wall for thereby reducing reaction forces that the shift drum plate receive from the stopper roller. The rider feels comfortable in shifting the transmission device into the final gear position. Thus, the operability of the transmission device is improved.

According to an embodiment of the present invention, when the stopper roller abuts against the roller limiting wall and the shift drum plate stops being turned, since the substantially right angle is formed between the straight line interconnecting the central point about which the stopper lever is swingable and the central point about which the stopper roller is rotatable, and the straight line tangential to the roller limiting wall at the point of intersection between the straight line and the roller limiting wall, a shock load that is applied from the shift drum plate to the stopper roller is oriented from the central point about which the stopper roller is rotatable toward the central point about which the stopper lever is rotatable, reducing a force component tending to turn the stopper lever outwardly away from the shift drum plate. It is thus possible to reduce the load which presses the stopper roller against the shift drum plate. Therefore, the transmission device is shifted more smoothly.

According to an embodiment of the present invention, the groove end portion of the lead groove that corresponds to the gear position at the dampening wall of the curved wall in the valley of the shift drum plate is longer than the groove end portion of the first lead groove that corresponds to the gear position that is free of the dampening wall of the curved wall in the valley of the shift drum plate. Therefore, even if the shift drum plate is turned through an increased angle due to the dampening wall, the groove end portion is prevented from undergoing an undue load when the shift drum plate is turned until the stopper roller abuts against the roller limiting wall.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will be described below with reference to FIGS. 1 through 16.

Figure 1:
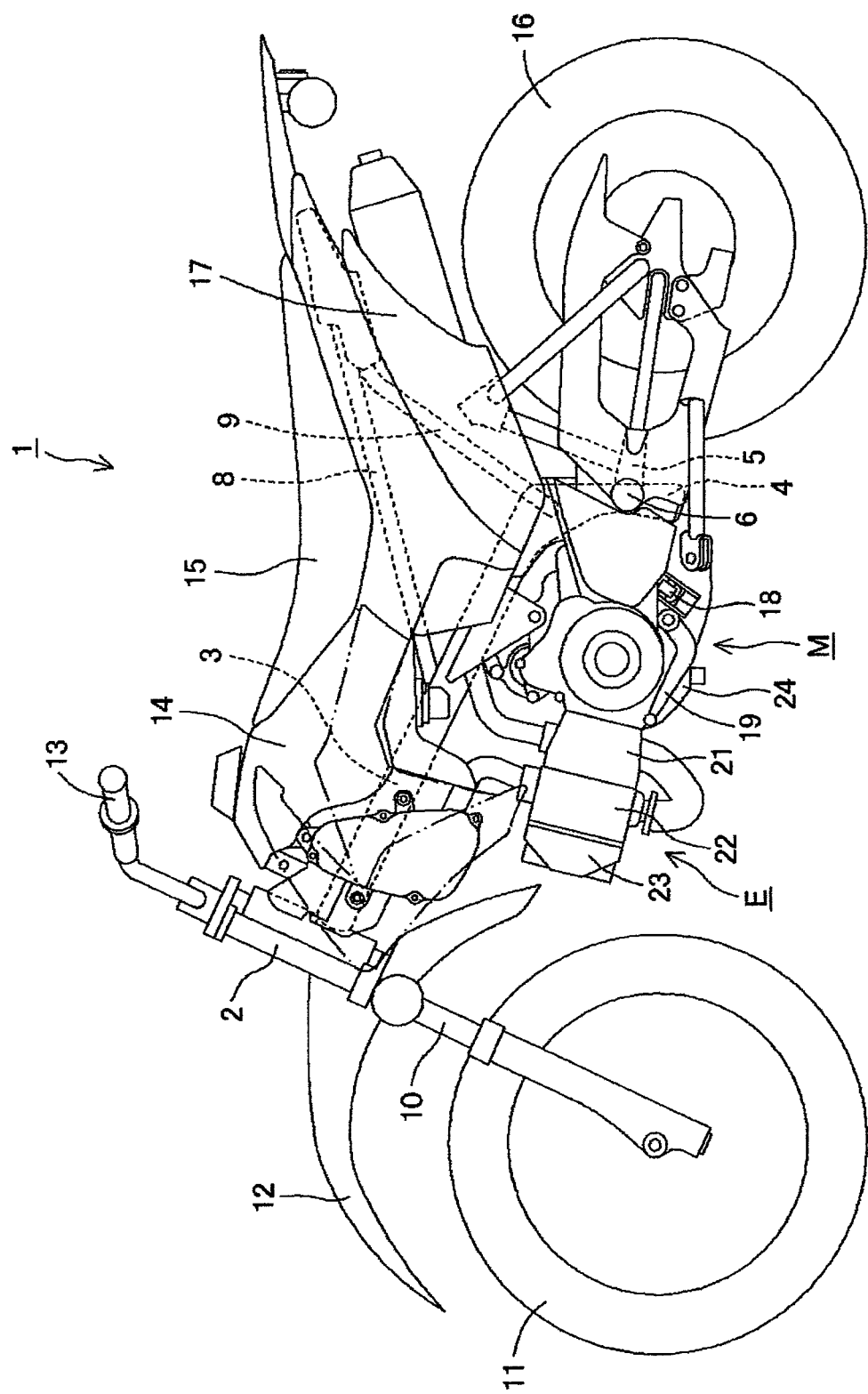
FIG. 1 is a side elevational view of a motorcycle incorporating a transmission mechanism according to an embodiment of the present invention.

FIG. 1 is a side elevational view of a motorcycle incorporating a transmission mechanism according to an embodiment of the present invention. In the present description, the direction in which the motorcycle moves forwardly is defined as a forward direction, and front, rear, left, and right are defined with respect to the rider of the motorcycle that faces in the forward direction.

The motorcycle 1 has a body frame including a main frame 3 extending rearwardly and obliquely downwardly from a head pipe 2, and a central frame 4 extending downwardly from the rear end of the main frame 3. A pivot 6 on which a rear fork 5 is pivotally supported is disposed on a lower central portion of the central frame 4.

A seat rail 8 has a front end supported on a bracket 7 mounted on the main frame 3 and a rear portion joined to the rear end of the main frame 3 by a back stay 9, that supports the seat rail 8.

A front fork 10 is pivotally supported by the head pipe 2. A front wheel 11 is rotatably supported on the lower end of the front fork 10, that supports a front fender 12 above the front wheel 11. A handle 13 extending to the left and right is mounted on the upper end of the head pipe 2.

A fuel tank 14 is mounted on the main frame 3 so as to lie across and over the main frame 3. A seat 15 is supported on the seat rail 8 behind the fuel tank 14.

The rear fork 5 has a front end pivotally supported by the pivot 6 on the central frame 4, and extends rearwardly with a rear wheel 16 rotatably supported on the rear end of the rear fork 5. A rear fender 17 is supported by the seat rail 8 and the back stay 9 above the rear wheel 16.

An internal combustion engine E that is mounted on the body frame includes a four-cycle internal combustion engine suspended between the main frame 3 and the central frame 4 with a cylinder 26 lying substantially horizontally.

Foot steps 18 for the rider to place his/her feet thereon are disposed on the body frame in the vicinity of a lower central region thereof. The motorcycle 1 has on its left side a change pedal 19 positioned forwardly of the foot steps 18 for changing gear positions of a transmission device M. When the rider depresses the change pedal 19 with his/her toe, the gears of the transmission device M are shifted down. When the rider turns up the change pedal 19 with his/her toe, the gears of the transmission device M are shifted up.

Figure 2:
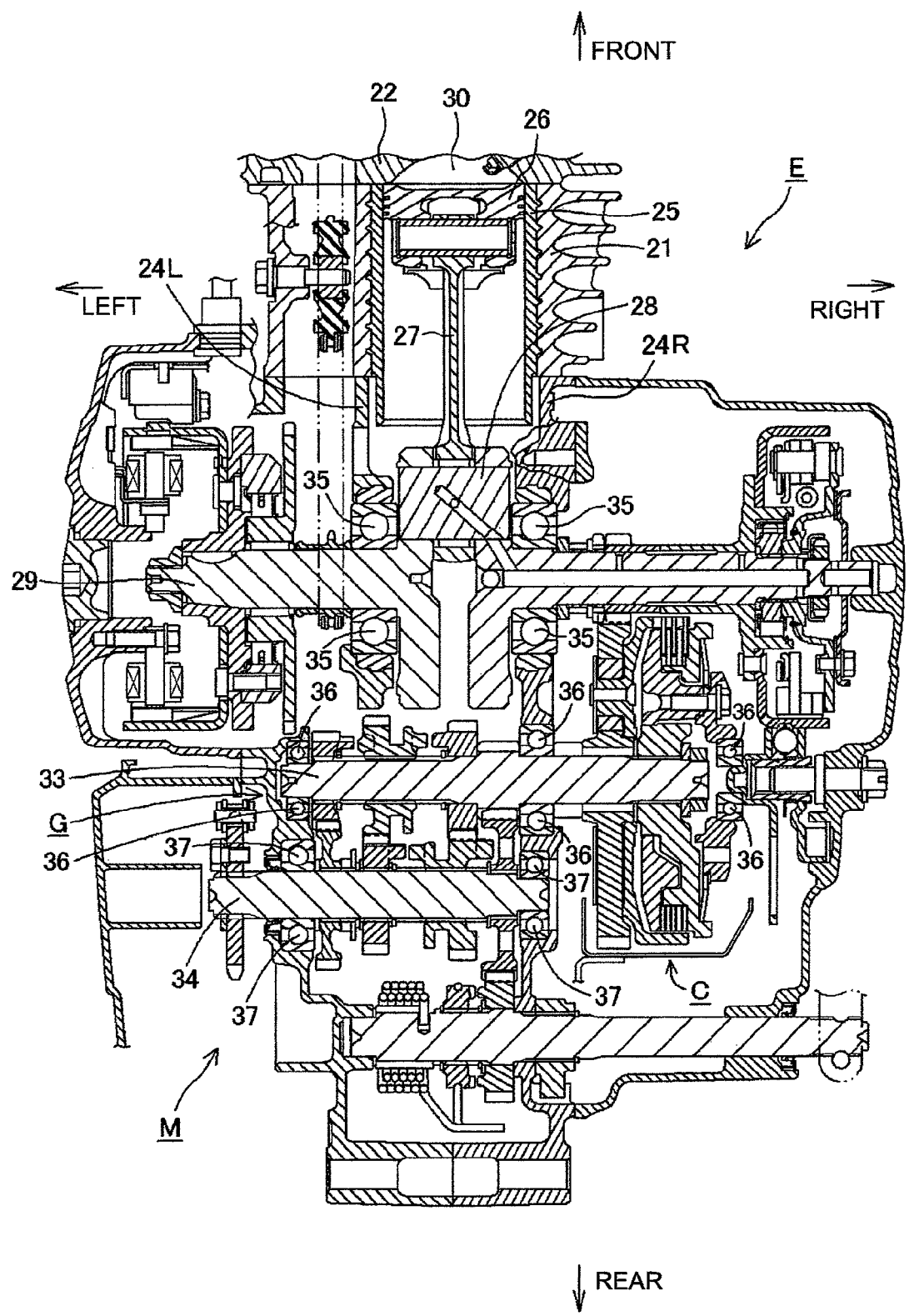
FIG. 2 is a cross-sectional view of the transmission mechanism according to the present embodiment and an internal combustion engine.

FIG. 2 is a cross-sectional view of the internal combustion engine E and the transmission device M.

The internal combustion engine E, which is a four-stroke internal combustion engine, includes a cylinder block 21 having a cylinder bore 25 defined therein substantially horizontally with a piston 26 slidably fitted in the cylinder bore 25. A cylinder head 22 and a head cover 23 are provided that are successively mounted on the cylinder block 21 and fastened integrally thereto with left and right crankcases 24R, 24L by which a crankshaft 29 is rotatably supported. The crankshaft 29 has a crankpin 28 connected to the piston 26 by a connecting rod 27. The cylinder head 22 has a combustion chamber 30 defined therein. When fuel is combusted in the combustion chamber 30, the combustion energy is converted into kinetic energy that vertically moves the piston 26. When the piston 26 is vertically moved, the connecting rod 27 rotates the crankshaft 29 about its own axis.

The crankshaft 29, a main shaft 33, and a countershaft 34, which are arranged to have their axes extending parallel to each other, are rotatably supported by respective sets of bearings 35, 36, 37 mounted in the left and right crankcases 24R, 24L. Rotational driver power generated by the crankshaft 29 is transmitted through a selectively disengageable clutch C to the main shaft 33 and then transmitted therefrom through the transmission device M that has a gear transmission mechanism G to the countershaft 34. The transmission device M according to the present embodiment can shift the gears into gear positions including first through fourth gear positions and a neutral position.

The transmission device M is shifted by the change spindle 61 that is angularly displaced when the rider operates the change pedal 19 shown in FIG. 1.

Figure 3:
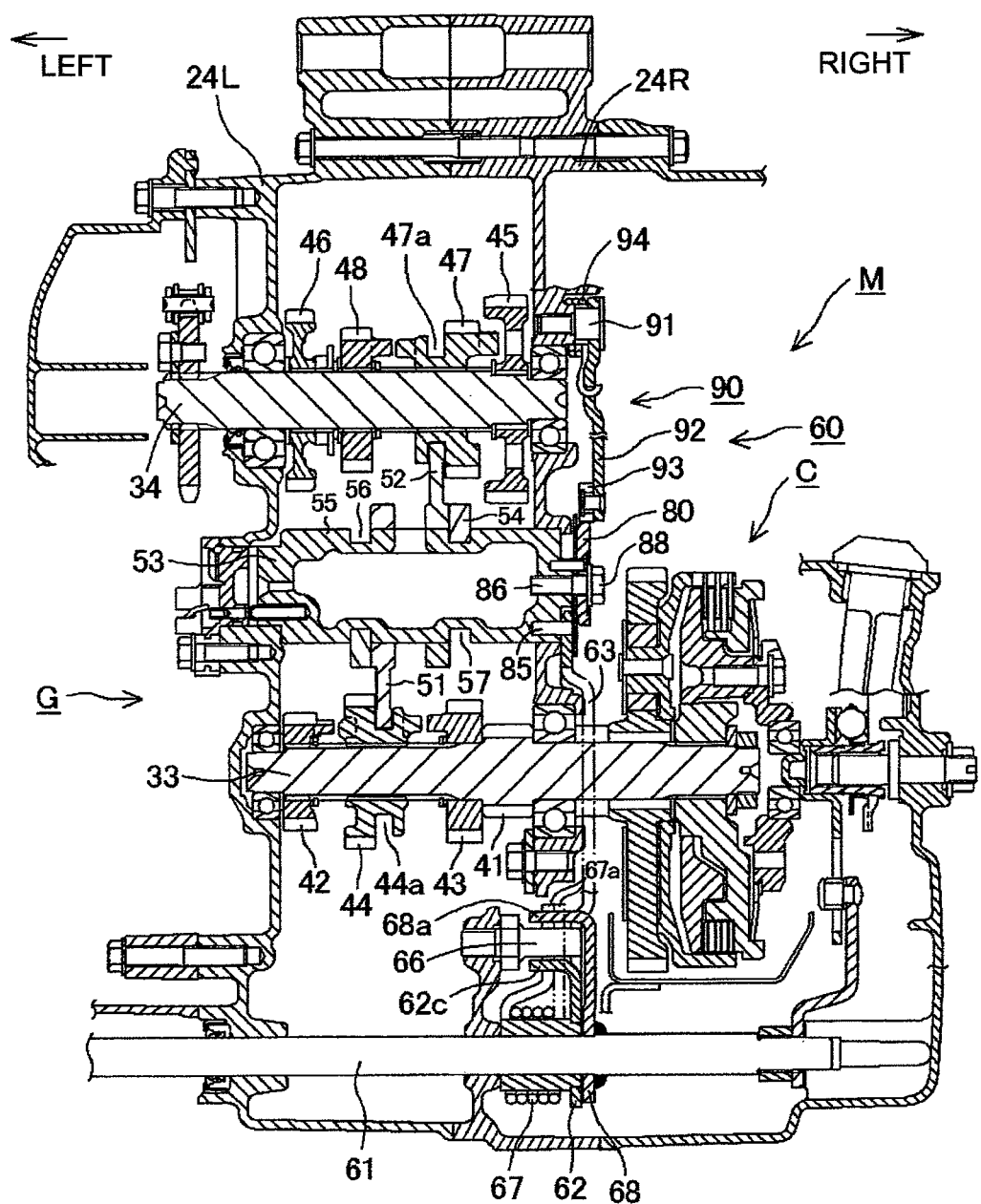
FIG. 3 is a cross-sectional view of the transmission mechanism.
Figure 4:
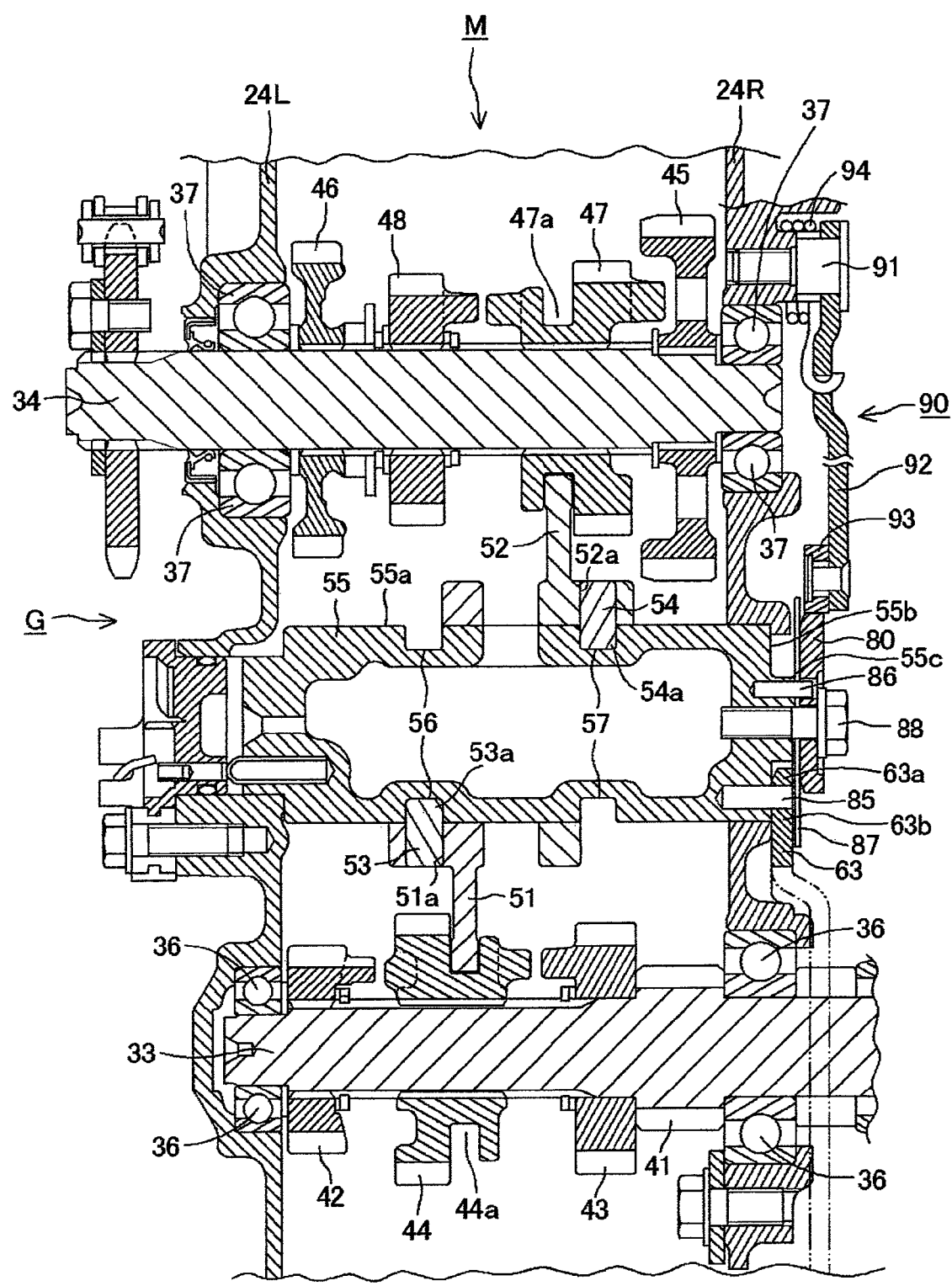
FIG. 4 is a fragmentary enlarged view of FIG. 3.

As shown in FIGS. 3 and 4, in the transmission device, the gear transmission mechanism G includes a plurality of gears supported on the main shaft 33 and the countershaft 34. More specifically, a first-gear-position drive gear 41, a third-gear-position drive gear 43, a fourth-gear-position drive gear 44, and a second-gear-position drive gear 42 are arrayed successively from the right on the main shaft 33. The first-gear-position drive gear 41 is integrally formed with the main shaft 33, and the third-gear-position drive gear 43 is rotatably supported on the main shaft 33. The fourth-gear-position drive gear 44 is splined to the main shaft 33, and the second-gear-position drive gear 42 is rotatably supported on the main shaft 33.

A first-gear-position driven gear 45, a third-gear-position driven gear 47, a fourth-gear-position driven gear 48, and a second-gear-position driven gear 46 are arrayed successively from the right on the countershaft 34. The first-gear-position driven gear 45 is rotatably supported on the countershaft 34, and the third-gear-position driven gear 47 is splined to the countershaft 34. The fourth-gear-position driven gear 48 is rotatably supported on the countershaft 34, and the second-gear-position driven gear 46 is fitted over the countershaft 34.

The gear transmission mechanism G is a normally-meshing-type transmission gear mechanism with the drive and driven gears meshing with each other in corresponding pairs.

Figure 5:
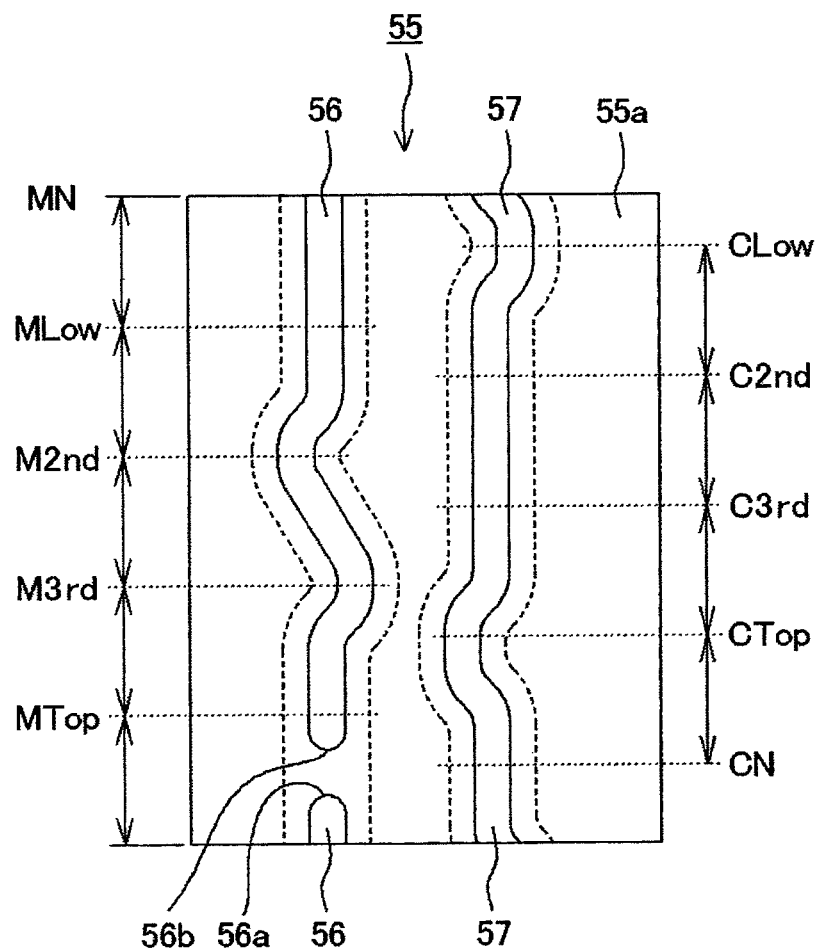
FIG. 5 is a view showing lead grooves in a shift drum.

As shown in FIG. 4, a shift drum 55 is disposed below the countershaft 34 between the left and right crankcases 24R, 24L and supported by the left and right crankcases 24R, 24L. As shown in FIG. 5, the shift drum 55 has a first lead groove 56 and a second lead groove 57 defined in an outer circumferential surface 55a thereof.

Figure 6:
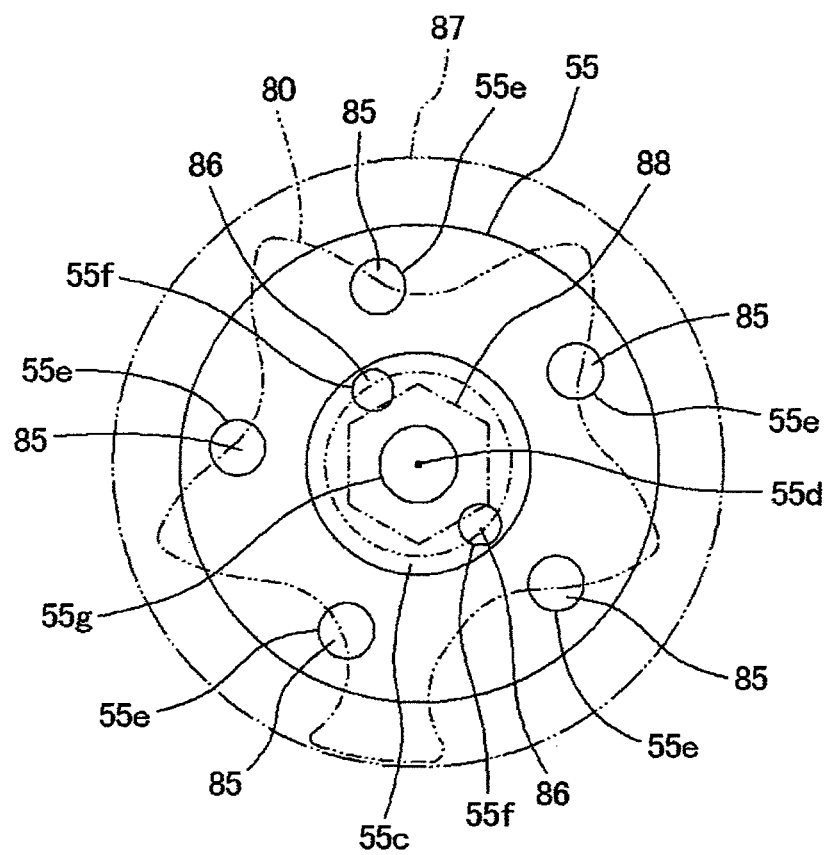
FIG. 6 is a side elevational view of a shift drum with feed pins and positioning pins inserted therein.

As shown in FIGS. 4 and 6, the shift drum 55 has a land 55c disposed on an end surface 55b thereof in concentric relation to the shift drum 55 as viewed in a side elevation. The end surface 55b also has five holes 55e defined therein that are angularly spaced at equal angular intervals about a central axis 55d of the shift drum 55. The land 55c has two holes 55f defined therein. The holes 55e receive respective feed pins 85 fitted therein for turning the shift drum 55. The holes 55f receive respective positioning pins 86 for positioning the shift drum 55 with respect to a shift drum plate 80. A presser plate 87 with holes 87a defined therein that receive the positioning pins 86 inserted therein is disposed on the land 55c while pressing the feed pins 85. The shift drum plate 80 has positioning holes 80a defined therein that receive the positioning pins 86 inserted therein. The shift drum 55, the presser plate 87, and the shift drum plate 80 are integrally fastened together by a bolt 88 threaded through the shift drum plate 80 and the presser plate 87 into the shift drum 55.

A first shift fork 51 and a second shift fork 52 for meshing the gears of the gear transmission mechanism G into different combinations are axially slidably supported on the shift drum 55.

The first shift fork 51 has a hole 51a defined therein with a first pin 53 fixedly fitted therein. The first pin 53 has an end 53a inserted in the first lead groove 56 of the shift drum 55. When the shift drum 55 is turned about its own axis, the first lead groove 56 is laterally or axially displaced at a position aligned with the first pin 53, displacing the first shift fork 51 laterally in the axial directions of the shift drum 55. The first shift fork 51 has a fork 51b engaging in a groove 44a defined in the fourth-gear-position drive gear 44 on the main shaft 33.

The second shift fork 52 has a hole 52a defined therein with a second pin 54 fixedly fitted therein. The second pin 54 has an end 54a inserted in the second lead groove 57 of the shift drum 55. When the shift drum 55 is turned about its own axis, the second lead groove 57 is laterally or axially displaced at a position aligned with the second pin 54, displacing the second shift fork 52 laterally in the axial directions of the shift drum 55. The second shift fork 52 has a fork 52a engaging in a groove 47a defined in the third-gear-position driven gear 47 on the countershaft 34.

When the shift drum 55 is turned a predetermined angle about its own axis, the first pin 53 and the second pin 54 are guided respectively by the first lead groove 56 and the second lead groove 57 to move to respective positions in the axial directions of the shift drum 55. The positions to which the first shift fork 51 and the second shift fork 52 are moved in the axial directions of the shift drum 55 are determined depending on the angle through which the shift drum 55 is turned. When the first shift fork 51 and the second shift fork 52 are moved to respective positions, the fourth-gear-position drive gear 44 splined to the main shaft 33 and the third-gear-position driven gear 47 splined to the countershaft 34 are axially moved to respective positions, bringing dog clutches on their side surfaces into mesh with adjacent gears thereby to change gear positions.

An intermittent feed mechanism 60 for intermittently turning the shift drum 55 about its own axis is mounted on the end of the shift drum 55. The intermittent feed mechanism 60 is coupled to the change spindle 61. When the rider operates the change pedal 19 to turn the change spindle 61 through a given angle about its own axis, the shift drum 55 is intermittently turned through a certain angle about its own axis.

Figure 7:
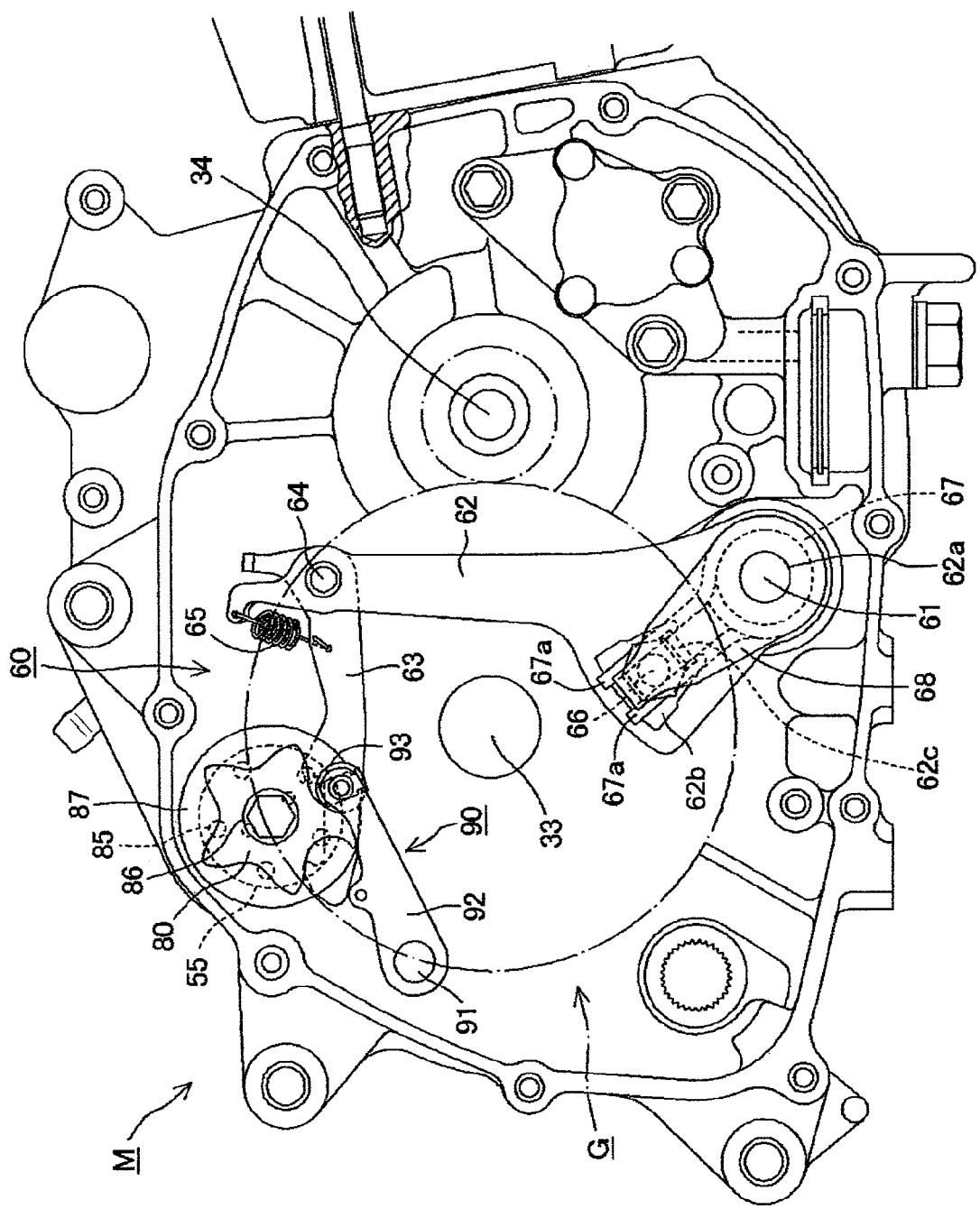
FIG. 7 is a side elevational view of the transmission mechanism.
Figure 8:
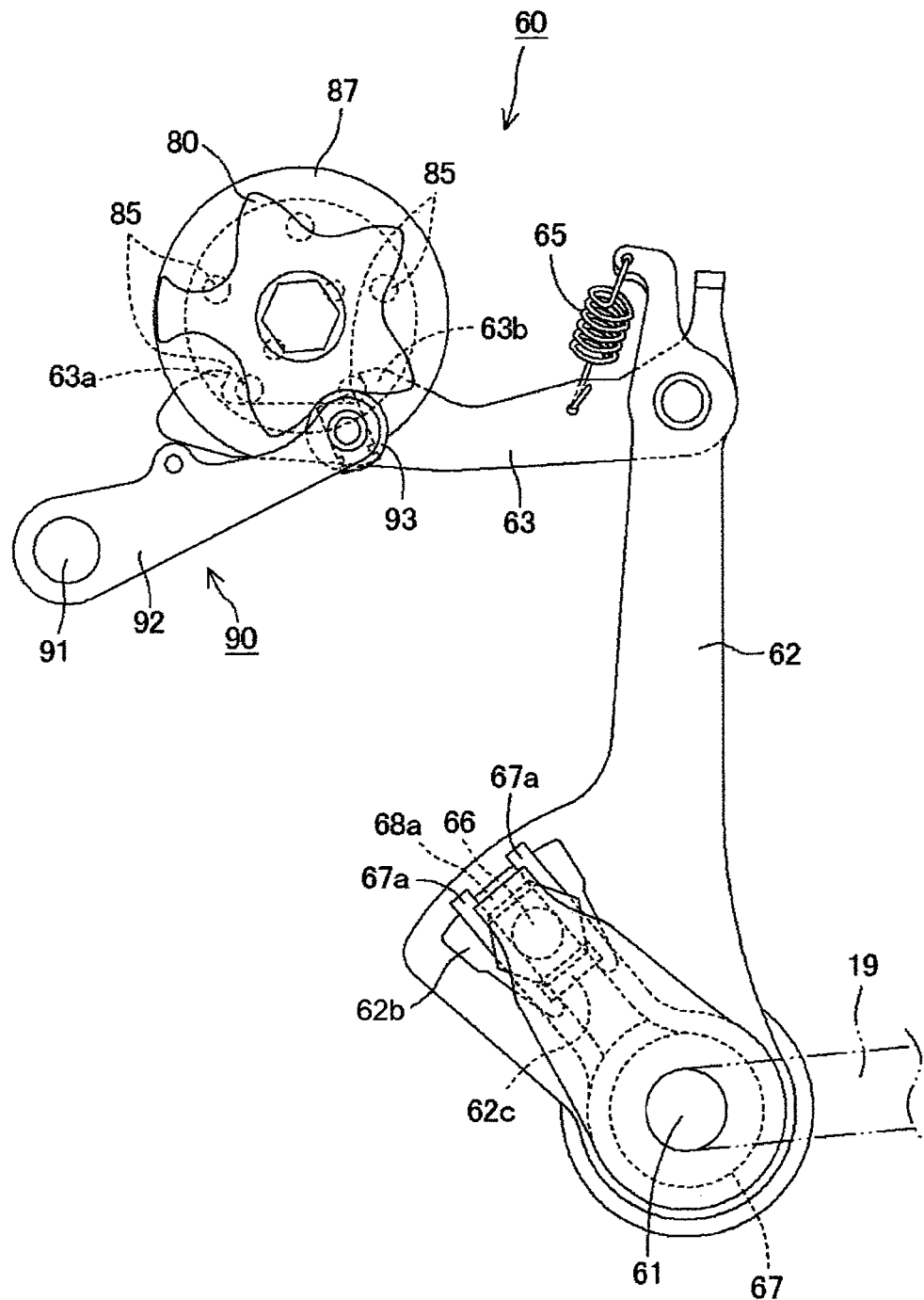
FIG. 8 is a plan view of an intermittent feed mechanism.

As shown in FIGS. 7 and 8, the intermittent feed mechanism 60 has a master arm 62 and a shift arm 63 as change spindle arms. The master arm 62 is fixedly fitted over the change spindle 61 for swinging movement about the central axis of the change spring 61 in unison with the change spindle 61. The shift arm 63 is swingably coupled to the master arm 62 by a joint pin 64 for swinging movement in response to the swinging movement of the master arm 62 for thereby turning the shift drum 55. The master arm 62 and the shift arm 63 are also joined to each other by a spring 65, that normally biases the shift arm 63 to turn in a certain direction with respect to the master arm 62. The intermittent feed mechanism 60 also has a limit pin 66 fixed to the crankcase 24R for limiting the angular movement of the master arm 62, a return spring 67 for biasing the master arm 62 to return after it has been angularly moved, the shift drum plate 80 that has a substantially starshaped profile, and a shift drum stopper 90 for limiting the movement of the shift drum plate 80.

The master arm 62 has a hole 62a defined therein in which the change spindle 61 is fitted, and a sectorial hole 62b defined therein. The master arm 62 has an edge bent into a finger 62c shown in FIG. 3 at an end of the hole 62b which is closer to the change spindle 61.

A limit pin 66 that is fixed to the crankcase 24R extends through the hole 62b of the master arm 62. The return spring 67 is coiled around the change spindle 61. A cover 68 is disposed on a side of the master arm 62 that is remote from the limit pin 66. As shown in FIG. 3, the cover 68 has a finger 68a bent toward the limit pin 66 from an end thereof near the hole 62b of the cover 68.

Figure 9:
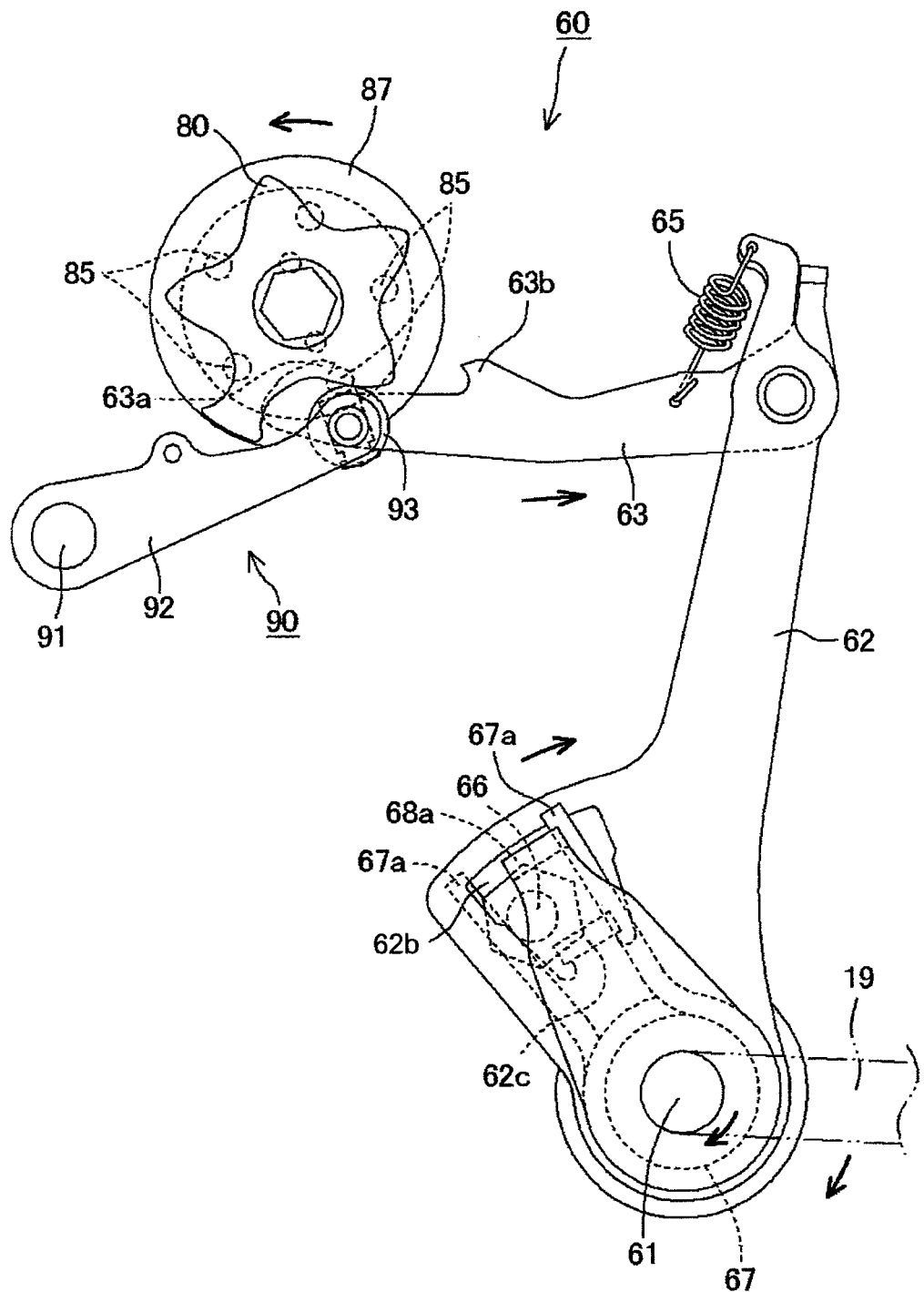
FIG. 9 is a plan view of the intermittent feed mechanism when the transmission mechanism is shifted down.
Figure 10:
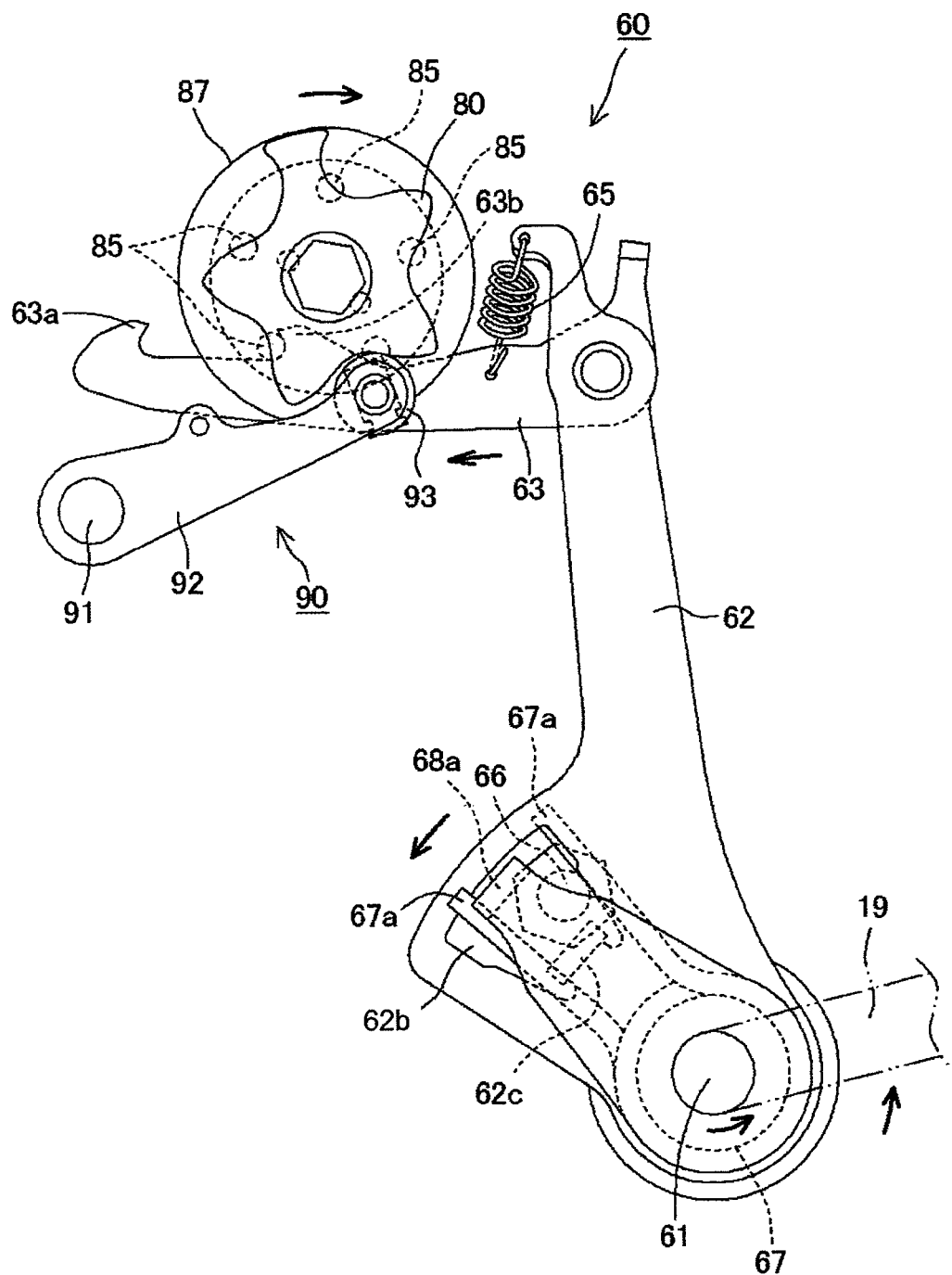
FIG. 10 is a plan view of the intermittent feed mechanism when the transmission mechanism is shifted up.

The return spring 67 has opposite ends 67a held in abutment against outer edges of the finger 62c of the master arm 62 and the finger 68a of the cover 68. As shown in FIGS. 9 and 10, when the change spindle 61 is turned to swing the master arm 62 in one direction or the other, outer edges of the fingers 62c, 68a push one of the ends 67a of the return spring 67, opening the return spring 67. Since the other outer edges of the fingers 62c, 68a are limited against movement by the limit pin 66, the master arm 62 is biased to return to the position thereof before it has been swung. As the master arm 62 is swung through a greater angle, an inner edge of the hole 62b abuts against the limit pin 66, limiting the master arm 62 against angular movement. Therefore, the master arm 62 is prevented from swinging beyond a certain angle.

The shift arm 63 is coupled by the joint pin 64 to the master arm 62 at an end thereof which is remote from the end thereof that is fixed to the change spindle 61. The shift arm 63 has a pair of spaced fingers 63a, 63b facing each other on a distal end portion thereof for feeding the feed pins 85 on the shift drum 55 for thereby turning the shift drum 55.

The spring 65, that joints the end of the master arm 62 remote from the change spindle 61 to the shift arm 63, normally biases the shift arm 63 to move toward the shift drum plate 80.

As shown in FIG. 4, the shift drum plate 80, that is disposed near the shift arm 63, is integrally fastened to the shift drum 53 by the bolt 88 for rotation in unison with the shift drum 53 that is rotatably supported by the crankcases 24R, 24L.

Figure 11:
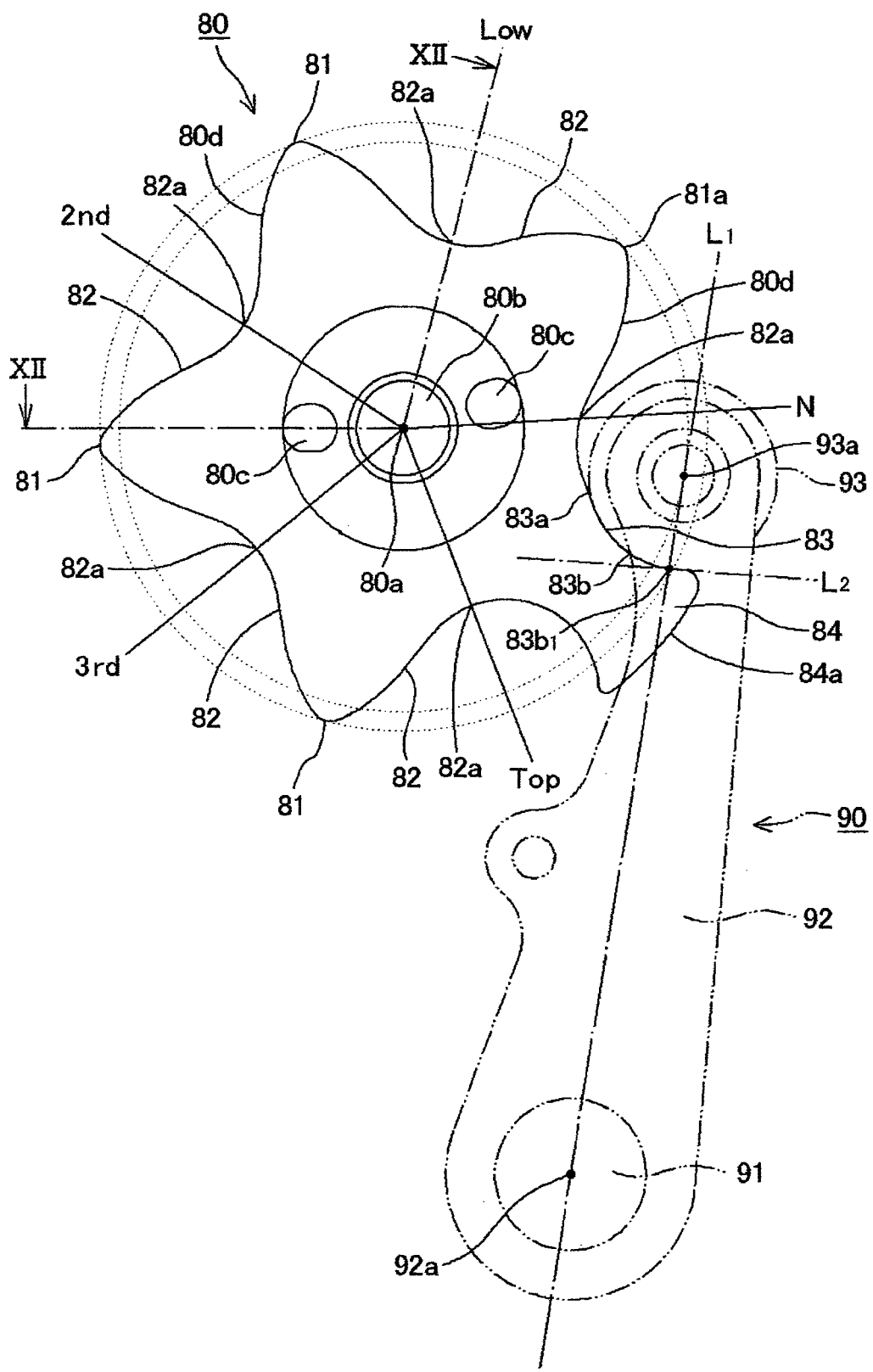
FIG. 11 is a plan view of a shift drum plate.
Figure 12:
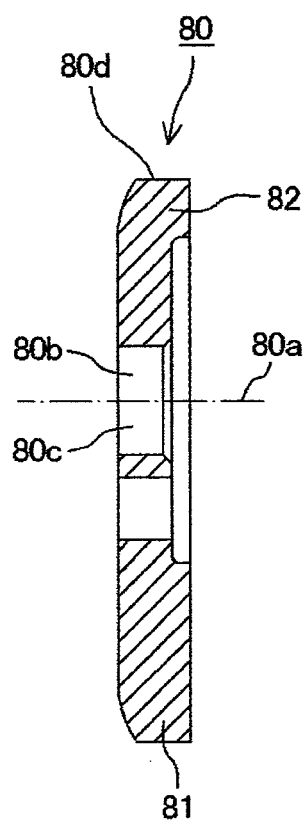
FIG. 12 is a cross-sectional view taken along line XII-XII of FIG. 11.

As shown in FIG. 11, the star-shaped shift drum plate 80 has five peaks 81 and five valleys 82 alternately disposed on its outer circumferential surface 80d. The valleys 82 are angularly spaced at equal angular intervals around a central axis 80a of the shift drum plate 80. The shift drum plate 80 has a central hole 80b defined centrally therein with the bolt 88 extending through the central hole 80b, and two positioning holes 80c defined therein with the positioning pins 86 extending respectively through the positioning holes 80c.

Figure 13:
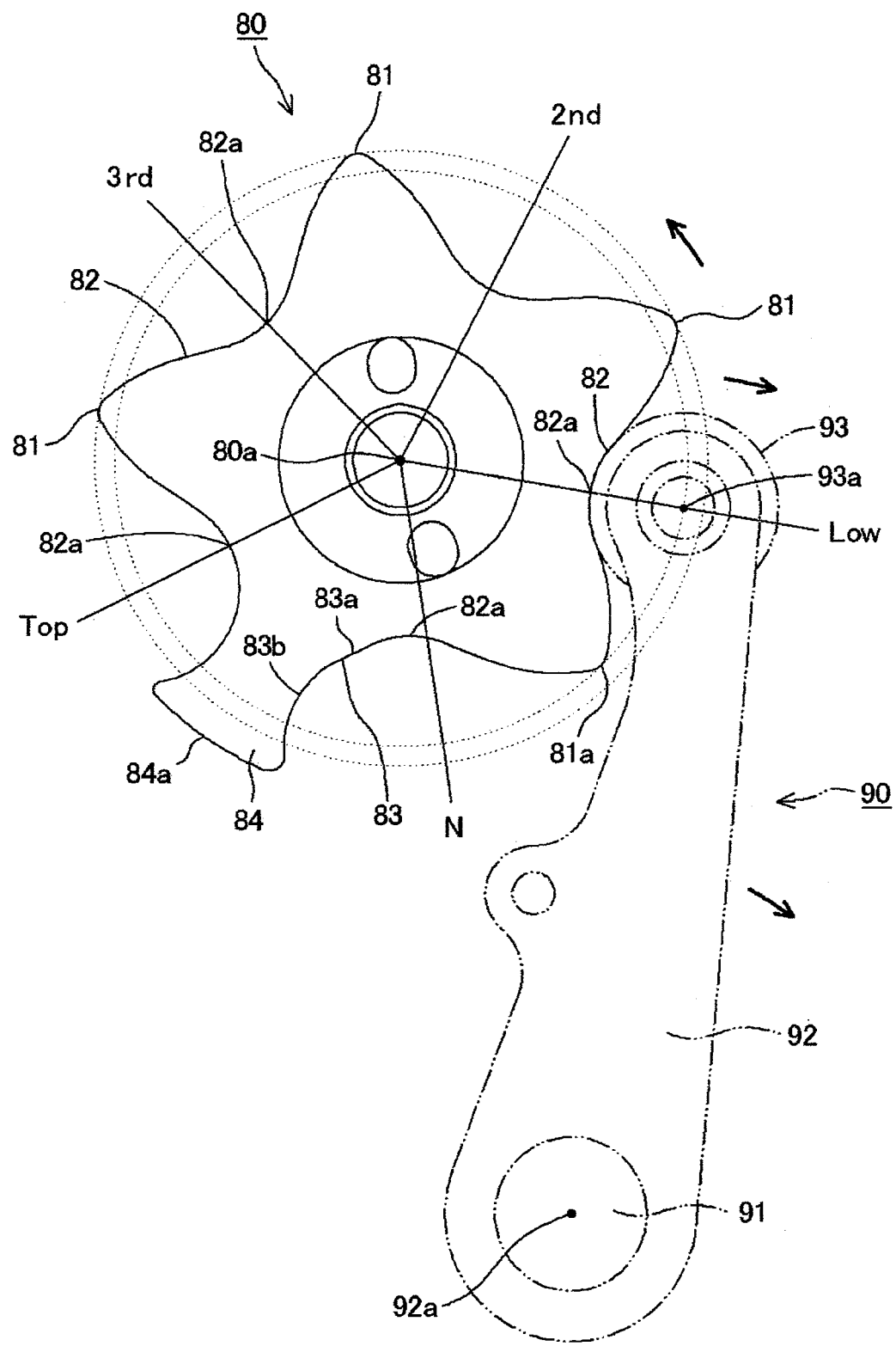
FIG. 13 is a plan view showing the manner in which the shift drum plate is turned.
Figure 14:
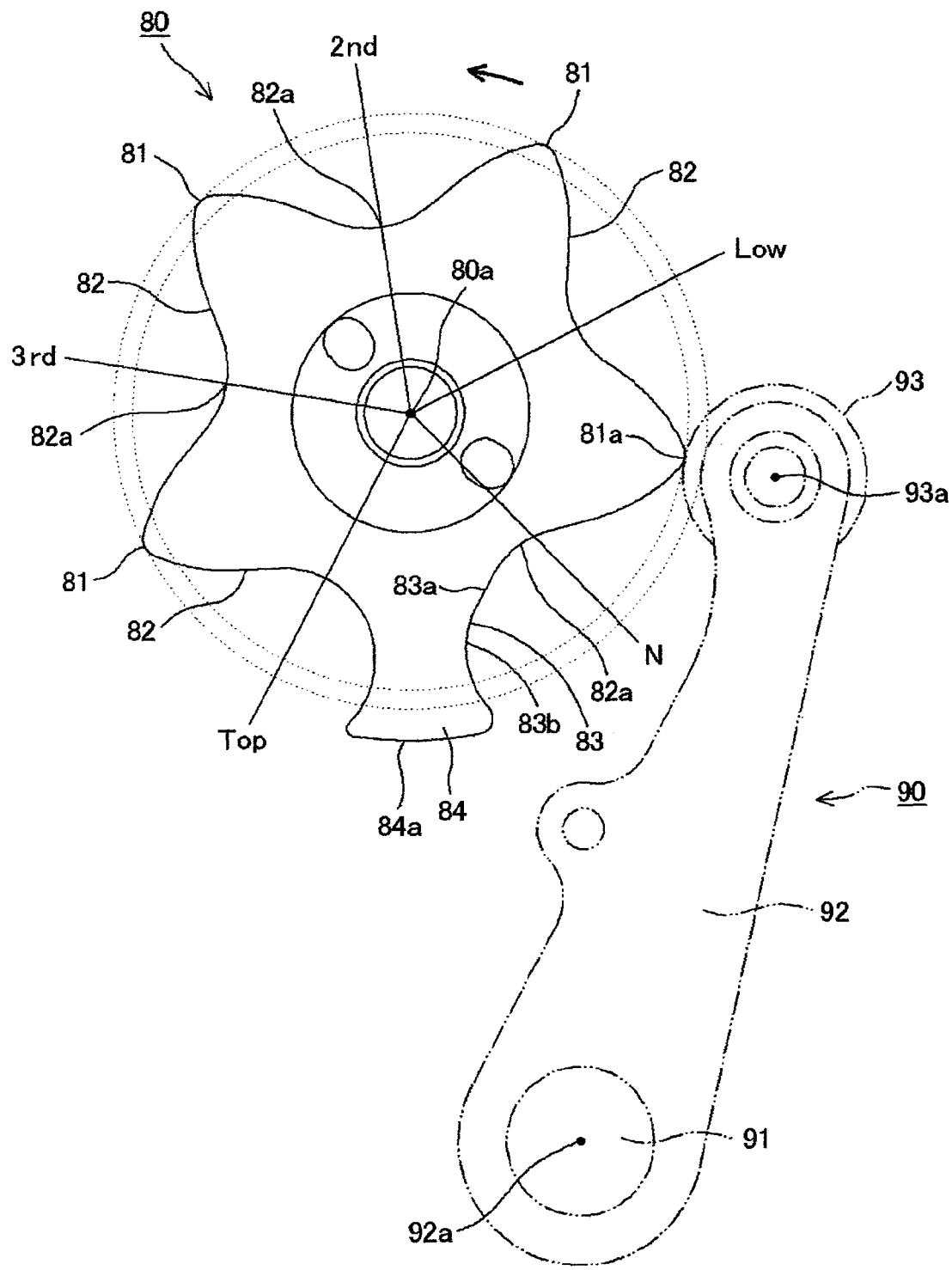
FIG. 14 is a plan view showing the manner in which the shift drum plate is turned.
Figure 15:
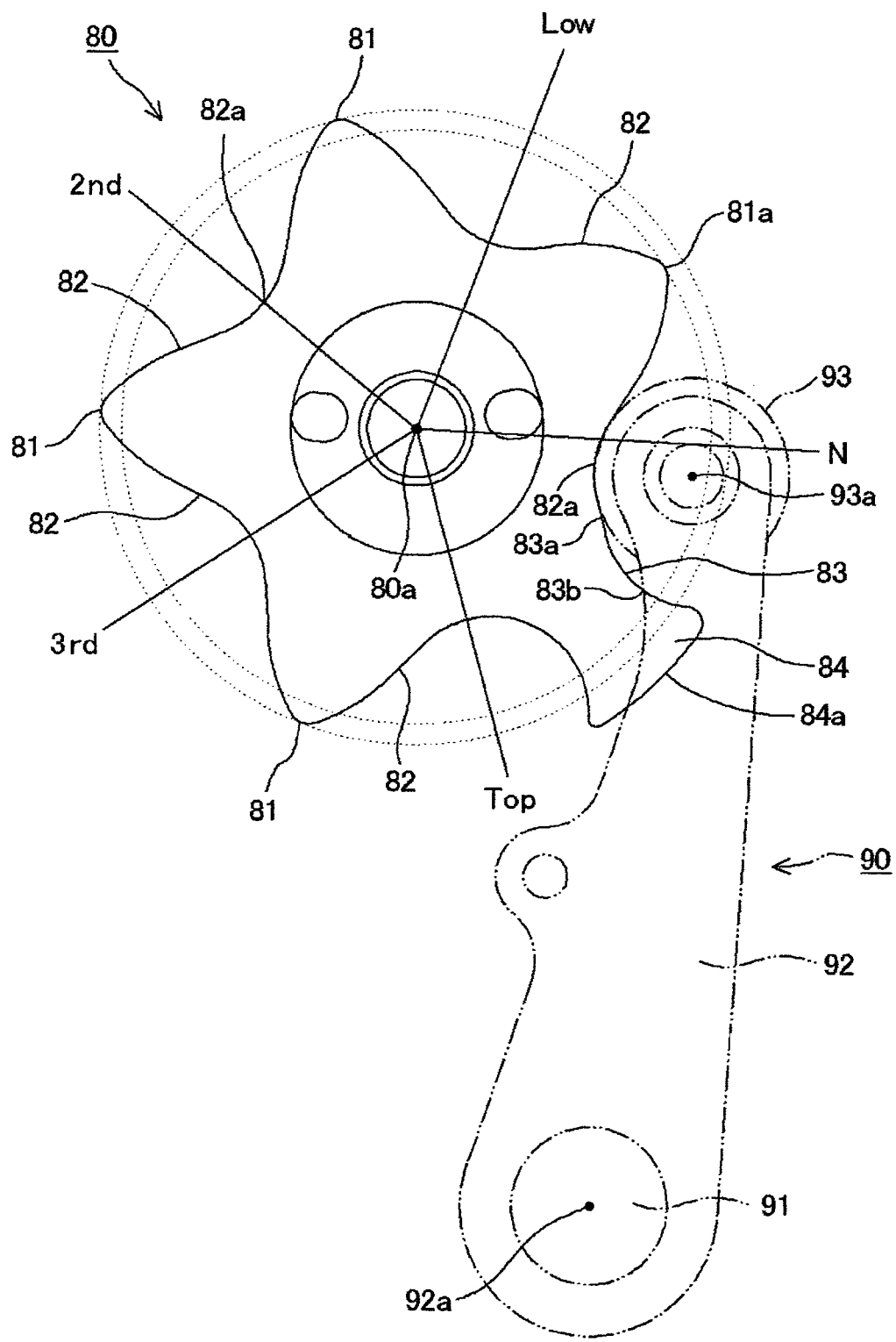
FIG. 15 is a plan view showing the manner in which the shift drum plate is turned.

As shown in FIGS. 4, 7, and 11, the shift drum stopper 90 is disposed adjacent to the shift drum plate 80. The shift drum stopper 90 has a support shaft 91 supported on a boss 24a of the crankcase 24R, a stopper lever 92 swingably supported on the support shaft 91, a stopper roller 93 rotatably supported on a distal end of the stopper lever 92 for being pressed against the outer circumferential surface 80d of the shift drum plate 80, and a returns spring 94 coiled around the boss 24a of the crankcase 24R for normally biasing the stopper roller 93 to be pressed against the outer circumferential surface 80d. As the shift drum plate 80 is turned about its own axis, as shown in FIGS. 13 through 15, the stopper roller 93 rolls over one of the peaks 81 into an adjacent one of the valleys 82. When the stopper roller 93 is placed in the valley 82, the stopper roller 93 is retained in the valley 82 under the bias of the return spring 94. In this manner, the shift drum plate 80 is intermittently fed, i.e., turned about the central axis 80a, successively through given angles.

The valleys 82 of the shift drum plate 80 have respective deepest areas 82a spaced most widely from the adjacent peaks 81. The deepest areas 82 have a curved surface whose radius of curvature is equal to the radius of curvature of the outer circumferential surface of the stopper roller 93 of the shift drum stopper 90.

As shown in FIG. 11, a curved wall 83 smoothly blends into the deepest area 82a of a selected one of the valleys 82. The curved wall 83 has a curved surface for contacting the stopper roller 93 more gently than the curved surface of the deepest area 82.

The curved wall 83 includes a dampening wall 83a and a roller limiting wall 83b. The dampening wall 83a blends into the deepest area 82a and has a curved surface whose radius of curvature is greater than the radius of curvature of the deepest area 82a or a flat surface. The roller limiting wall 83b is positioned remotely from the deepest area 82a across the dampening wall 83a and smoothly blends into the dampening wall 83a. The roller limiting wall 83b has a curved surface whose radius of curvature is substantially equal to the radius of curvature of the outer circumferential surface of the stopper roller 93.

As shown in FIG. 11, when the stopper roller 93 abuts against the roller limiting wall 83b, stopping the shift drum plate 80 against rotation, a substantially right angle is formed between a straight line $L_1$ interconnecting a central point 92a about which the stopper lever 92 is swingable and a central point 93a about which the stopper roller 93 is rotatable, and a straight line $L_2$ tangential to the roller limiting wall 83b at a point $83b_1$ of intersection between the straight line $L_1$ and the roller limiting wall 83b.

The peak 81 adjacent to the roller limiting wall 83b is formed as a limiter 84 that is different in shape from the other peaks 81. As shown in FIG. 8, the limiter 84 is higher than the other peaks 81, and has a crest surface 84a that is of an arcuate shape extending around the central axis 80a, so that the stopper roller 93 cannot move over the limiter 84.

Of the peaks 81 that are disposed adjacent to the valley 82 joined to the curved wall 83, the peak 81a that is positioned opposite to the limiter 84 is lower than the other peaks 81.

When the stopper roller 93 is pressed against the roller limiting wall 83b of the valley 82 that has the curved wall 83, the shift drum 55 is turned to a prescribed position, putting the transmission device M in the neutral position.

When the stopper roller 93 is placed successively in the valleys 82 that are angularly spaced counterclockwise from the valley 82 joined to the curved wall 83, the transmission device M is put successively into the first gear position, the second gear position, the third gear position, and the fourth gear position.

The transmission device M thus constructed operates as follows: For shifting up the transmission device M, the rider lifts the change pedal 19 with his/her toe. When the change pedal 19 is lifted, as shown in FIG. 10, the change spindle 61 fixed to the change pedal 19 is turned clockwise, causing the master arm 62 to swing counterclockwise about the change spindle 61. The shift arm 63 is pushed to the left to cause one of the fingers 63a thereof to feed a corresponding one of the feed pins 85 on the shift drum 55, thereby turning the shift drum 55 clockwise about its own axis. The intermittent feed mechanism 60 turns the shift drum 55 through a given angle, and then stops the shift drum 55. The first lead groove 56 and the second lead groove 57 that are defined in the outer circumferential surface 55a of the shift drum 55 guide the first pin 53 and the second pin 54 to respective given positions. The first shift fork 51 and the second shift fork 52 that are fixed respectively to the first pin 53 and the second pin 54 are now moved to respective given positions in the axial directions of the shift drum 55. The fourth-gear-position drive gear 44 and the third-gear-position driven gear 47 are moved to respective given positions, causing ones of the dog clutches on both sides of the fourth-gear-position drive gear 44 and the third-gear-position driven gear 47 to engage dog clutches of adjacent gears. The transmission device M is thus shifted up into a desired gear position.

For shifting down the transmission device M, the rider depresses the change pedal 19 with its toe. When the change pedal 19 is depressed, as shown in FIG. 9, the change spindle 61 fixed to the change pedal 19 is turned counterclockwise, causing the master arm 62 to swing clockwise about the change spindle 61. The shift arm 63 is pulled to the right to cause one of the fingers 63a thereof to feed a corresponding one of the feed pins 85 on the shift drum, thereby turning the shift drum 55 counterclockwise about its own axis. The intermittent feed mechanism 60 turns the shift drum 55 through a given angle, and then stops the shift drum 55. The first lead groove 56 and the second lead groove 57 that are defined in the outer circumferential surface of the shift drum 55 guide the first pin 53 and the second pin 54 to respective given positions. The first shift fork 51 and the second shift fork 52 that are fixed respectively to the first pin 53 and the second pin 54 are now moved to respective given positions in the axial directions of the shift drum 55. The fourth-gear-position drive gear 44 and the third-gear-position driven gear 47 are moved to respective given positions, causing ones of the dog clutches on both sides of the fourth-gear-position drive gear 44 and the third-gear-position driven gear 47 to engage dog clutches of adjacent gears. The transmission device M is thus shifted down into a desired gear position.

As described above, the transmission device M is shifted up when the rider lifts the change pedal 19 with his/her toe, and shifted down when the rider depresses the change pedal 19 with his/her toe. For shifting the transmission device M in an effort to bring the motorcycle to a halt, it is necessary for the rider to depress the change pedal 19 successively to change the transmission device M from a higher gear position to a lower gear position before reaching the neutral position. The final gear shifting process carried out by depressing the change pedal 19 changes from the first gear position to the neutral position.

The relationship between the first and second lead grooves 56, 57 of the shift drum 55 and the gear positions of the gear transmission mechanism G is illustrated in FIG. 5. The transmission device M can be shifted into a total of five gear positions, i.e., the first, second, third, and fourth gear positions, and the neutral position. The first and second lead grooves 56, 57 are formed such that the shift drum 55 is turned through an angle of 72 degrees between any two of the five gear positions.

The first lead groove 56 is a groove for guiding the first shift fork 51 to move the third-gear-position drive gear 43 fitted over the main shaft 33 to a given position. The first lead groove 56 has a groove end portion 56a extending from the position corresponding to the neutral position and a groove end portion 56b extending from the position corresponding to the fourth gear position.

The groove end portion 56b extends from the position corresponding to the fourth gear position over a distance which corresponds to a certain angular interval, e.g., 13 degrees, of the shift drum 55. The groove end portion 56a serves to allow the shift drum 55 to turn with play, absorbing shocks when the shift drum 55 is turned to shift the transmission device M into the fourth gear position.

Figure 16:
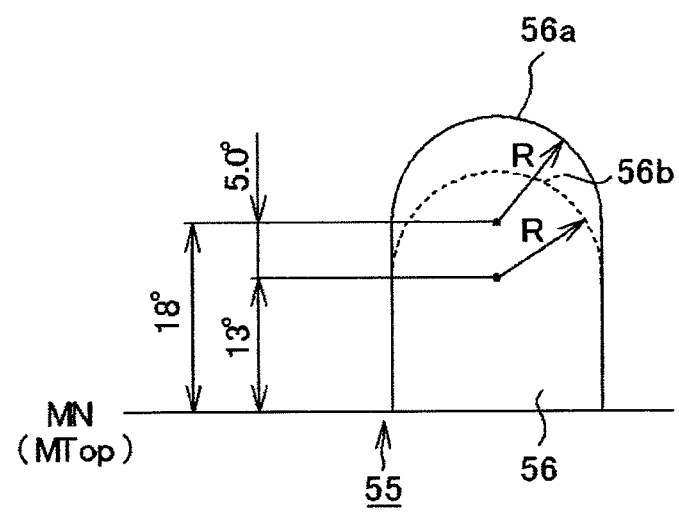
FIG. 16 is a fragmentary enlarged view of FIG. 5.

FIG. 16 is a fragmentary enlarged view of FIG. 5, showing the groove end portion 56a with solid lines and the groove end portion 56b in broken lines, the groove end portion 56b being illustrated as turned 180 degrees and overlapping the groove end portion 56a. As shown in FIG. 16, the groove end portion 56a extends from the position corresponding to the neutral position over the sum of a distance which corresponds to a certain angular interval, e.g., 13 degrees, of the shift drum 55 for allowing the shift drum 55 to turn with play, when the shift drum 55 is turned to shift the transmission device M into the fourth gear position, and a distance which corresponds to an angle of 5 degrees, for example, for allowing the shift drum 55 to turn with play, thereby absorbing shocks. According to the present embodiment, the length of the groove end portion 56a that extends from the neutral gear position is greater by about 3 mm than the length of the groove end portion 56b that extends from the fourth gear position.

The valley 82 of the shift drum plate 80 that corresponds to the neutral position is joined to the dampening wall 83a of the curved wall 83. When the transmission device M is shifted into the neutral position, consequently, the shift drum plate 80 is turned through an angle that is greater than the angle through which the shift drum plate 80 is turned when the transmission device M is shifted into the fourth gear position. Therefore, the length of the groove end portion 56a that extends from the neutral gear position is greater than the length of the groove end portion 56b that extends from the fourth gear position, as described above.

Operation of the transmission device M at the time it is shifted from the first gear position into the neutral position will be described below.

FIGS. 8 and 13 show the intermittent feed mechanism at the time the transmission device M is in the first gear position. When the rider depresses the change pedal 19 in order to shift the transmission device M from the first gear position into the neutral position, the change spindle 61 fixed to the change pedal 19 is turned clockwise as shown in FIG. 9, turning the master arm 62 clockwise about the change spindle 61. The shift arm 63 is pulled to the right to cause one of the fingers 63a thereof to feed a corresponding one of the feed pins 85 on the shift drum 55, thereby turning the shift drum 55 counterclockwise about its own axis.

As the shift drum 55 is turned counterclockwise, the shift drum plate 80 integrally fastened to the shift drum 55 is also turned counterclockwise, causing the stopper roller 93 to move over the peak 81a of the shift drum plate 80 as shown in FIG. 14.

As shown in FIG. 9, after the master arm 62 has swung through a maximum allowable swinging range, the stopper lever 92 is returned under the bias of the return spring 94, and the shift drum plate 80 continues to turn under its own inertia, so that the stopper roller 93 comes into contact with the deepest area 82a of the valley 82, as shown in FIG. 15. After the stopper roller 93 is brought into contact with the dampening wall 83a of the curved wall 83, as shown in FIG. 11, the shift drum plate 80 is turned until the stopper roller 93 abuts against the roller limiting wall 83b of the curved wall 83, and then stops being turned.

As shown in FIG. 11, when the stopper roller 93 abuts against the roller limiting wall 83b and the shift drum plate 80 stops being turned, a substantially right angle is formed between the straight line $L_1$ interconnecting the central point 92a about which the stopper lever 92 is swingable and the central point 93a about which the stopper roller 93 is rotatable, and the straight line $L_2$ tangential to the roller limiting wall 83b at the point $83b_1$ of intersection between the straight line $L_1$ and the roller limiting wall 83b. When the rotation of the shift drum plate 80 is stopped by the limiting wall 83b, therefore, a shock load that is applied from the roller limiting wall 83b of the shift drum plate 80 to the stopper lever 92 is oriented substantially along the straight line $L_1$. As only a slight force component is generated that tends to turn the stopper lever 92 outwardly away from the shift drum plate 80, the shift drum plate 80 reliably stops being turned. Therefore, the transmission device M is smoothly shifted into the neutral position.

Even when the rider depresses the change pedal 19 successively to shift down the transmission device M quickly into lower gear positions, causing the shift drum 55 and the shift drum plate 80 to turn with increased forces of inertia, since the valley 82 corresponding to the neutral position is combined with the curved wall 83 for contacting the stopper roller 93 more gently than the curved surface of the deepest area 82a, the shift drum plate 80 is prevented from stopping abruptly the instant the stopper roller 93 reaches the deepest area 82a of the valley 82. Rather, the shift drum plate 80 is continuously turned while the stopper roller 93 is rolling along the dampening wall 83a, and then stops being turned when the stopper roller 98 abuts against the roller limiting wall 83b. Therefore, a shock that is applied from the shift drum plate 80 to the stopper roller 93 is reduced. Consequently, the stopper lever 92 that supports the stopper roller 83 and the support shaft 91 that supports the stopper lever 92 are made durable, and the stopper lever 92 may be reduced in size and weight. The rider can quickly operate the change pedal 19 to move the shift drum plate 80 for thereby increasing the operability of the transmission device M.

Since the peak 81a that is positioned next to the curved wall 83 of the shift drum plate 80 is lower than the other peaks 81, the stopper roller 93 that moves from the peak 81a to the curved wall 83 swings a reduced distance, which, in combination with the reduced weight of the stopper lever 92, is capable of reducing reaction forces that the curved wall 83 receives from the stopper roller 93. The dampening wall 83a of the curved wall 83 can thus be reduced in length. Therefore, the curved wall 83 can be reduced in size. Thus, the transmission device M can also be reduced in size.

The roller limiting wall 83b can limit changing mechanism members including the shift drum 55 against excessive rotation through the shift drum plate 80. In addition, the dampening wall 83a up to the roller limiting wall 83b can absorb a load under forces of inertia generated by the operation of the change mechanism. The change mechanism can thus operate well under a reduced load.

Inasmuch as the shift drum plate 80 and the change spindle 61 are positioned with the gear transmission mechanism G interposed therebetween, the master arm 62 and the shift arm 63, which are long arms, can easily achieve a lever ratio for the transmission device M. This, in combination with the increased freedom of the layout of the transmission device M, makes it possible to reduce the size of the internal combustion engine E.

Even when the rider depresses the change pedal 19 successively to shift down the transmission device M quickly into lower gear positions, since the valley 82 of the shift drum plate 80 which corresponds to the lowest gear position is combined with the curved wall 83 for thereby reducing reaction forces that the shift drum plate 80 receive from the stopper roller 93. The rider feels comfortable in shifting the transmission device M into the final gear position. Thus, the operability of the transmission device M is improved.

When the stopper roller 93 abuts against the roller limiting wall 83b and the shift drum plate 80 stops being turned, a substantially right angle is formed between the straight line $L_1$ interconnecting the central point 92a about which the stopper lever 92 is swingable and the central point 93a about which the stopper roller 93 is rotatable, and the straight line L2 tangential to the roller limiting wall 83b at the point of intersection between the straight line $L_1$ and the roller limiting wall 83b. Thus, a shock load that is applied from the shift drum plate 80 to the stopper roller 93 when the shift drum plate 80 is stopped is oriented from the central point 93a of the stopper roller 93 toward the central point 92a of the stopper lever 92, reducing a force component tending to turn the stopper lever 92 outwardly away from the stopper lever 92. It is thus possible to reduce the load that presses the stopper roller 93 against the shift drum plate 80. Therefore, the transmission device M is shifted more smoothly.

Furthermore, the groove end portion 56a of the first lead groove 56 that corresponds to the gear position at the dampening wall 83a of the curved wall 83 in the valley 82 of the shift drum plate 80 is longer than the groove end portion 56b of the first lead groove 56 that corresponds to the gear position that is free of the dampening wall of the curved wall in the valley of the shift drum plate. Therefore, even if the shift drum plate 80 is turned through an increased angle due to the dampening wall 83a, the groove end portion 56a is prevented from undergoing an undue load when the shift drum plate 80 is turned until the stopper roller 93 abuts against the roller limiting wall 83*b*.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission device for an internal combustion engine, comprising:
   a shift drum angularly movable by a star-shaped shift drum plate, said star-shaped drum plate being turned when a change spindle is turned;
   a stopper roller for limiting the star-shaped shift drum plate against turning movement;
   said star-shaped shift drum plate includes peaks having a predetermined height, said peaks corresponding to a plurality of gear positions and valleys interposed between the peaks; and
   a limiter having a height greater than the predetermined height of the peaks and a selected one of the valleys formed by the limiter includes a curved wall for being more gently contacted by said stopper roller than curved surfaces of the other valleys which are contacted by said stopper roller.

2. The transmission device for an internal combustion engine according to claim 1, wherein one of said peaks of said star-shaped shift drum plate, which is disposed next to said curved wall, is lower in height relative to the predetermined height of the other peaks.

3. The transmission device for an internal combustion engine according to claim 1, wherein said one of the valleys has a deepest area, and a curved surface extending from one of said peaks which is next to said curved wall has a radius of curvature that is equal to the radius of curvature of the outer profile of said stopper roller;
   said curved wall includes a roller limiting wall and a dampening wall;
   said roller limiting wall is disposed on a side of said deepest area toward which said stopper roller rolls; and
   said dampening wall is disposed between said roller limiting wall and said deepest area and has either a curved surface having a radius of curvature that is greater than the radius of curvature of the outer profile of said stopper roller or having a flat surface.

4. The transmission device for an internal combustion engine according to claim 2, wherein said one of the valleys has a deepest area, and a curved surface extending from one of said peaks which is next to said curved wall has a radius of curvature that is equal to the radius of curvature of the outer profile of said stopper roller;
   said curved wall includes a roller limiting wall and a dampening wall;
   said roller limiting wall is disposed on a side of said deepest area toward which said stopper roller rolls; and
   said dampening wall is disposed between said roller limiting wall and said deepest area and has either a curved surface having a radius of curvature that is greater than the radius of curvature of the outer profile of said stopper roller or having a flat surface.

5. The transmission device for an internal combustion engine according to claim 1, wherein said star-shaped shift drum plate is spaced from said change spindle with a gear transmission mechanism of the transmission device interposed therebetween;
   said transmission device further includes a pair of change spindle arms; and
   one of said change spindle arms turns said star-shaped shift drum plate.

6. The transmission device for an internal combustion engine according to claim 2, wherein said star-shaped shift drum plate is spaced from said change spindle with a gear transmission mechanism of the transmission device interposed therebetween;
   said transmission device further includes a pair of change spindle arms; and
   one of said change spindle arms turns said star-shaped shift drum plate.

7. The transmission device for an internal combustion engine according to claim 3, wherein said star-shaped shift drum plate is spaced from said change spindle with a gear transmission mechanism of the transmission device interposed therebetween;
   said transmission device further includes a pair of change spindle arms; and
   one of said change spindle arms turns said star-shaped shift drum plate.

8. The transmission device for an internal combustion engine according to claim 1, wherein said curved wall of said star-shaped shift drum plate is disposed in said selected one of the valleys which corresponds to a lowest one of gear positions selected when a change pedal disposed in front of a foot step is depressed.

9. The transmission device for an internal combustion engine according to claim 2, wherein said curved wall of said star-shaped shift drum plate is disposed in said selected one of the valleys which corresponds to a lowest one of gear positions selected when a change pedal disposed in front of a foot step is depressed.

10. The transmission device for an internal combustion engine according to claim 3, wherein when said stopper roller abuts against said roller limiting wall, stopping said shift drum plate against rotation, a substantially right angle is formed between a straight line interconnecting a central point about which a stopper lever supporting said stopper roller is swingable and a central point about which said stopper roller is rotatable, and a straight line tangential to said roller limiting wall at a point of intersection between said straight line and said roller limiting wall.

11. The transmission device for an internal combustion engine according to claim 5, wherein when said stopper roller abuts against said roller limiting wall, stopping said shift drum plate against rotation, a substantially right angle is formed between a straight line interconnecting a central point about which a stopper lever supporting said stopper roller is swingable and a central point about which said stopper roller is rotatable, and a straight line tangential to said roller limiting wall at a point of intersection between said straight line and said roller limiting wall.

12. The transmission device for an internal combustion engine according to claim 3, wherein said shift drum has a lead groove defined in a surface thereof for guiding a shift fork for changing gear positions of a gear transmission mechanism of the transmission device when said shift drum is turned, said lead groove having groove end portions; and
   one of said groove end portions, that corresponds to the gear position at said dampening wall of said curved wall in said valley of said shift drum plate, is longer than the other of said groove portions that corresponds to the gear position which is free of said dampening wall of the curved wall.

13. The transmission device for an internal combustion engine according to claim 5, wherein said shift drum has a lead groove defined in a surface thereof for guiding a shift fork for changing gear positions of a gear transmission mechanism of the transmission device when said shift drum is turned, said lead groove having groove end portions; and
    one of said groove end portions, that corresponds to the gear position at said dampening wall of said curved wall in said valley of said shift drum plate, is longer than the other of said groove portions that corresponds to the gear position which is free of said dampening wall of the curved wall.

14. A transmission device for an internal combustion engine, comprising:
    a shift drum;
    a star-shaped shift drum plate;
    a change spindle;
    said shift drum being angularly movable by the star-shaped shift drum plate when said star-shaped drum plate is turned by said change spindle;
    a stopper roller for limiting the star-shaped shift drum plate against turning movement;
    peaks formed in said star-shaped shift drum, said peaks have a predetermined height and said peaks correspond to a plurality of gear positions with valleys interposed between the peaks; and
    a limiter having a height greater than the predetermined height of the peaks and a selected one of the valleys formed by the limiter includes a curved wall for being more gently contacted by said stopper roller relative to the curved surfaces of the other valleys that are contacted by said stopper roller.

15. The transmission device for an internal combustion engine according to claim 14, wherein one of said peaks of said star-shaped shift drum plate, which is disposed next to said curved wall, is lower in height relative to the predetermined height of the other peaks.

16. The transmission device for an internal combustion engine according to claim 14, wherein said one of the valleys has a deepest area, and a curved surface extending from one of said peaks which is next to said curved wall has a radius of curvature that is equal to the radius of curvature of the outer profile of said stopper roller;
    said curved wall includes a roller limiting wall and a dampening wall;
    said roller limiting wall is disposed on a side of said deepest area toward which said stopper roller rolls; and
    said dampening wall is disposed between said roller limiting wall and said deepest area and has either a curved surface having a radius of curvature that is greater than the radius of curvature of the outer profile of said stopper roller or having a flat surface.

17. The transmission device for an internal combustion engine according to claim 14, wherein said star-shaped shift drum plate is spaced from said change spindle with a gear transmission mechanism of the transmission device interposed therebetween;
    said transmission device further includes a pair of change spindle arms; and
    one of said change spindle arms turns said star-shaped shift drum plate.

18. The transmission device for an internal combustion engine according to claim 15, wherein said star-shaped shift drum plate is spaced from said change spindle with a gear transmission mechanism of the transmission device interposed therebetween;
    said transmission device further includes a pair of change spindle arms; and
    one of said change spindle arms turns said star-shaped shift drum plate.

19. The transmission device for an internal combustion engine according to claim 14, wherein said curved wall of said star-shaped shift drum plate is disposed in said selected one of the valleys which corresponds to a lowest one of gear positions selected when a change pedal disposed in front of a foot step is depressed.

20. The transmission device for an internal combustion engine according to claim 16, wherein said shift drum has a lead groove defined in a surface thereof for guiding a shift fork for changing gear positions of a gear transmission mechanism of the transmission device when said shift drum is turned, said lead groove having groove end portions; and
    one of said groove end portions, that corresponds to the gear position at said dampening wall of said curved wall in said valley of said shift drum plate, is longer than the other of said groove portions that corresponds to the gear position which is free of said dampening wall of the curved wall.

\* \* \* \* \*